United States Patent [19]

Davis et al.

[11] Patent Number: 5,360,777
[45] Date of Patent: Nov. 1, 1994

[54] HIGH PERFORMANCE ALUMINA HEAT TRANSFER SOLIDS FOR HIGH TEMPERATURE FLUIDIZED BED SYNTHESIS GAS REACTIONS

[75] Inventors: Stephen M. Davis; LeRoy R. Clavenna, both of Baton Rouge, La.; Rocco A. Fiato, Basking Ridge, N.J.; Geoffrey R. Say, Baton Rouge, La.

[73] Assignee: Exxon Research and Engineering Company, Florham Park, N.J.

[21] Appl. No.: 60,395

[22] Filed: May 11, 1993

[51] Int. Cl.$^5$ ............... B01J 20/02; B01J 20/30; B01J 21/02
[52] U.S. Cl. ............... 502/202; 502/232; 502/355; 502/415
[58] Field of Search ............ 502/202, 408, 415, 355, 502/232; 423/132

[56] References Cited

U.S. PATENT DOCUMENTS

| | | | |
|---|---|---|---|
| 2,961,297 | 11/1960 | Fenerty | 423/132 |
| 3,105,739 | 10/1963 | Hayes | 502/355 |
| 3,271,325 | 9/1966 | Davies et al. | 502/355 |
| 3,883,442 | 5/1975 | McArthur | 502/202 |
| 4,703,028 | 10/1987 | Steininger | 502/355 |

*Primary Examiner*—Carl F. Dees
*Attorney, Agent, or Firm*—Llewellyn A. Proctor

[57] ABSTRACT

Alumina heat transfer solids are admixed with a catalyst, or catalysts, and used in conducting high temperature fluidized bed reactions, particularly in a process for the production of hydrogen and carbon monoxide from a low molecular weight hydrocarbon by contact with a fluidized bed of catalyst and said heat transfer solids at high temperature in the presence of oxygen, or steam, or both oxygen and steam. The particulate heat transfer solids are characterized as having a performance index, PI, greater than 20, preferably greater than 40, as characterized by the formula $PI=[(i)\times(ii)\times(iii)\times(iv)]^{-1}$ where (i) the peripheral outer surface of the particle contains $<5$ atom % (Si+B) as impurities, and (ii) $<20$ atom % Na, Fe, Ca and Ti as impurities, where the bulk concentrations of the (Si+B) is sufficient to migrate into and contaminate the outer surface layer of the particles at process conditions. Moreover the (iii) tapped bulk density of the particles range from about 1.2 g/cc to about 2.5 g/cc, and (iv) the Davison Attrition Index of the particles is no greater than about 12.

8 Claims, No Drawings

HIGH PERFORMANCE ALUMINA HEAT TRANSFER SOLIDS FOR HIGH TEMPERATURE FLUIDIZED BED SYNTHESIS GAS REACTIONS

FIELD OF THE INVENTION

This invention relates to a process utilizing a heat transfer solid in admixture with a catalyst, or catalysts to provide a fluidizable contact mass for conducting synthesis gas generation reactions. In particular, it relates to a process which utilizes high surface purity aluminas, and composition, for conducting high temperature fluidized bed synthesis gas operations.

BACKGROUND

Particulate refractory inorganic oxide solids, e.g., alumina, have been employed for many years as catalyst supports, or carriers, in natural or synthetic form. For example, synthesis gas, or syn gas (hydrogen and carbon monoxide), is produced from low molecular weight hydrocarbons, primarily methane, reacted in the presence of steam (steam reforming process) or oxygen (partial oxidation process), or both steam and oxygen, at high temperature within a fluidized bed of catalyst, e.g., nickel on an alpha alumina support. Suitably, particulate refractory inorganic oxide solids, notably alpha alumina solids, can be admixed with the catalyst, or catalysts, of the fluidized bed as heat transfer solids to control the temperature of reaction. Processes utilizing the admixtures of catalysts and heat transfer solids in reacting low molecular weight hydrocarbons in the presence of both steam and oxygen, it has been found, have provided overall improved thermal and economic efficiencies in the production of syn gas.

Certain particulate refractory inorganic oxide solids as heat transfer materials are more resistant than others to melting and agglomeration at the severe high temperature oxidizing and reducing conditions encountered in fluidized bed syn gas generation processes. These particulate refractory inorganic oxides permit substantially isothermal reactor conditions in conducting such reactions, at least so long as they resist melting and agglomeration which leads to reduced fluidization quality, gas bubbles of increased size, and inferior mass transfer. Moreover, the mechanical strength of some particulate solids is greater than others, and in any process the particles must be sufficient to withstand the stress and strain of process operations. An important pathway to loss of material from a fluidized bed relates to particle degradation through mechanical attrition and break up of the particles to produce fines. The amount of mechanical fracturing and attrition of the particles that can be tolerated during the operation is necessarily limited, and inevitably, in any process some of the solids particles will be swept from the bed by the ascending fluidization gas, or gases. Process economics often militates against the use of devices which prevent the escape of any fines from the process, and generally, with the devices that are used, some fines are lost from the reactor. Whereas cyclone separators are widely used, and can be used to return major concentrations of the solids particles to the bed, no cyclone separator, or system of cyclone separators can be operated with one hundred percent efficiency. Hence, a significant amount of the particulate solids may escape from the process. Make up solids must therefore be added to the reactor to compensate for this loss; any loss represents waste, and additional cost for collection and disposal.

Sintering and agglomeration of the fluidized bed solids have been found particularly important pathways for fluidized bed degradation, and loss of catalyst activity in high temperature fluidized bed operations for the production of syn gas. Hot spots, particularly as occurs in the zones of oxygen injection, produces sintering and agglomeration of the particles. The temperatures in these zones far exceed the normally high temperature of reaction outside these zones, often by several hundred Fahrenheit degrees. Surface melting of the particles, for any reason whatever, creates a tendency of the particles to fuse, or stick together to form agglomerates; and agglomeration of the particulate solids promotes defluidization of the bed. Particulate heat transfer solids must also be chemically compatible with the catalyst of the fluidized bed for contamination and poisoning of the catalyst cannot be tolerated. Albeit there are a few which stand out as exceptional in a relative sense, no particulate refractory oxide solid is now known which possesses the combination of properties which would render it a heat transfer solid capable of completely withstanding sintering, agglomeration and attrition to the desired degree at the extreme conditions encountered in commercial fluidized bed syn gas operations, particularly commercial fluidized bed syn gas operations at extreme hydrothermal conditions. Thus, there exists an acute need for further improving and maintaining the fluidization characteristics of the bed, or beds, employed in fluidized bed syn gas (FBSG) processes.

DESCRIPTION OF THE INVENTION

The present invention relates to a method, or process, for selecting or preparing a particulate alumina heat transfer solids component useful for the production of hydrogen and carbon monoxide from a low molecular weight hydrocarbon by contact thereof with a fluidized bed comprised of an admixture of said heat transfer component and a catalyst at high temperature in the presence of steam, oxygen, or both steam and oxygen. The heat transfer component of this invention provides improvements in the fluidization characteristics of the bed, promotes highly efficient heat and mass transfer within the reacting gas phase, and is highly resistant to sintering and agglomeration. To obtain the benefits of this invention it is required to select, or treat a particulate alumina, preferably a particulate alpha alumina, sufficient to provide, or produce, certain characteristics relating to surface purity, particle density and attrition resistance; characteristics each of which can improve the performance of the heat transfer solids component in conducting fluidized bed synthesis gas (FBSG) operations, and which can cumulatively provide highly optimum benefits. These characteristics which, cumulatively, can be formulated into a performance index requires that (i) the outer surface layer of the alumina particles contains silicon and boron (Si+B) in concentration no greater than about 5 atom percent, preferably no greater than about 2 atom percent, based on the total number of aluminum ions [(Si+B)/Al] within the outer surface of the particles; (ii) the outer surface layer of the alumina particles contains sodium, iron, calcium and titanium in concentration no greater than about 20 atom percent, preferably no greater than about 15 atom percent, based on the total number of aluminum ions [(Na+Fe+Ca+Ti)/Al] in the outer surface of the particles; (iii) the tapped bulk density of the alumina particles ranges from about 1.2 grams/cubic centimeter (g/cc) to about 2.5 g/cc, preferably from about 1.2 g/cc to about 1.8 g/cc; and (iv) the Davison jet attrition index, DI, of the particles is no greater than about 12, preferably no greater than about 6. The performance index, PI, can be characterized by the formula $$PI = \frac{1}{(i) \times (ii) \times (iii) \times (iv)}$$

where (i), (ii), (iii) and (iv) are as above defined. The numeral value of PI is preferably a number equal to or greater than 20, and more preferably a number equal to or greater than 40.

The surface composition of the heat transfer solids particles employed in the process is critical, and the reduction of (Si+B) impurities, or the lack thereof, in the outer surface layer of the alumina particles as described in (i) will reduce the tendency of the particles to sinter and agglomerate at FBSG operating conditions. Moreover, the reduction of (Na+Fe+Ca+Ti), or the lack thereof, in the outer surface layer of the alumina particles as described in (ii) will further reduce the tendency of the particles to sinter and agglomerate at FBSG operating conditions. It has been found that the reduction of the sum-total concentration of the (Si+B) and (Na+Fe+Ca+Ti) impurities, respectively, from the outer surface of the alumina particles, suitably as measured from the outer peripheral surface of a particle inwardly (toward its center) to a depth of about 50 Angstrom units, Å, using X-ray photoelectron spectroscopy (XPS) suppresses the tendency of the particles to sinter and agglomerate when employed in FBSG operations.

In determining (i) the silicon and boron (Si+B) concentrations and (ii) the sum-total concentration of (Na+Fe+Ca+Ti) in accordance with the XPS technique, the surface of the particles is bombarded with X-rays produced using an aluminum anode maintained at a potential of about 10 kilovolts. The X-rays induce the emission of electrons from the outer surface of the particles, and the energy distribution of the emitted electrons is characteristic of the elements present in the outer surface of the particle. Integration of the photoelectron peaks gives a quantitative elemental analysis of the outermost surfaces of the particles i.e., from the peripheral surface of a particle inwardly to a distance of about 50 Å, as measured by XPS.

It has been found that the surface concentrations of the (Si B) and (Na+Fe+Ca+Ti) impurities, respectively, generally exceeds the corresponding bulk concentrations of these impurities in the alumina particles; often by several orders of magnitude. However, no simple direct relationship has been found between the surface composition and the bulk composition of the particles. For example, it has been found that alpha aluminas with different bulk concentrations of (Si+B) and (Na+Fe+Ca+Ti) impurities, respectively, which display similar surface compositions produce similar agglomeration characteristics. Also, alpha aluminas with similar bulk concentrations of (Si+B) and (Na+- Fe+Ca+Ti) impurities, respectively, but have significant differences in the surface concentrations of (Si+B) and (Na+Fe+Ca+Ti) impurities, respectively, produce different agglomeration characteristics; viz. the alpha aluminas containing significant higher surface concentrations of these surface impurities also possesses a significantly greater tendency to agglomerate than those specimens containing lesser surface concentrations of these impurities. It has been found that alumina particles the surface concentration of the (Si+B) impurities of which does not exceed about 5 atom percent, preferably 2 atom percent, lessens considerably the tendency of the particles to sinter and agglomerate when employed as heat transfer solids in FBSG, operations. Moreover, when the surface concentrations of (Na+Fe+Ca+Ti) impurities in the outer surface of particles is no greater than about 20 atom percent, preferably no greater than about 15 atom percent, the tendency of the particles to sinter and agglomerate when employed as heat transfer solids in FBSG operations is even further reduced.

Whereas the surface composition of particulate aluminas, notably alpha aluminas, cannot be directly related to bulk impurity concentrations of (Si+B) or (Na+Fe+Ca+Ti), respectively, it has been found that particles which have a high outer surface and bulk purity, or which can be treated to provide a high outer surface purity, provided these high levels of surface purity can be maintained during FBSG operations, will exhibit high resistance to sintering and agglomeration. Particulate refractory aluminas, notably alpha aluminas, which contain silicon in bulk concentration greater than about 0.5 wt %, or boron in bulk concentration greater than 500 parts, per million parts by weight of the particles (wppm), or both silicon and boron in these high amounts concentrated throughout the bulk solids, are generally not useful in FBSG operations. All too soon these particles will sinter and agglomerate. In fact, even when these particulate solids are treated to reduce the level of (Si+B) to a concentration below 5 atom percent, or preferably 2 atom percent, within the outer surface of these particles, the particles will sinter and agglomerate all too soon at the conditions of synthesis gas processing operation because the silicon and boron cations will migrate from below the outer surface of the particles into the outer surface layer during synthesis gas manufacturing operations and collect there in concentrations sufficient to produce sintering and agglomeration of the particles. In contrast however, when the particles which contain silicon in bulk concentration less than about 0.5 wt. percent, or boron in bulk concentration less than about 500 wppm, or both silicon and boron in amounts below these levels, respectively, are treated to reduce the (Si+B) concentration to 5 atom percent or less, or to 2 atom percent or less, in the outer surface of the particle, the particulate solids will become highly resistant to sintering and agglomeration at FBSG conditions of operation. Moreover, albeit the greatest benefit is obtained by reduction of the silicon and boron levels in the outer surface of the particles, further suppression of the tendency of the particles to sinter and agglomerate is obtained by treatment of such particles to additionally reduce in the outer surface of such particles, the sum-total concentration of all of the sodium, iron, calcium, and titanium impurities to levels not exceeding about 20 atom percent, preferably to levels not exceeding about 15 atom percent.

The (iii) tapped bulk density of the particles will generally range from about 1.2 g/cc to about 2.5 gm/cc, preferably from about 1.2 g/cc to about 1.8 gm/cc, as measured by ASTM D 4164-88. Such particles will exhibit superior fluidization characteristics, resulting in smaller gas bubbles and more effective heat and mass transfer. Moreover, such particles are often attrition resistant, and will produce lesser amounts of fines. Particulate alpha alumina solids particles of hollow spherical shape with tapped bulk density ranging between about 1.1 gm/cc to about 2.0 gm/cc, preferably from about 1.1 gm/cc to about 1.8 gm/cc, it has been found, offers a particularly favorable combination of fluidization characteristics and attrition resistance in FBSG operations. A particle of this type is defined as having a dense phase shell of thickness ranging from about 2 microns, $\mu$m, to about 25 $\mu$m, preferably from about 5 $\mu$m to about 15 $\mu$m, surrounding a large central void space. Particulate inorganic oxide solids having densities below those herein expressed are characterized by high concentrations of intraparticle void spaces, the void spaces weakening the particle resulting in poor attrition resistance.

The (iv) Davison Attrition Index, D.I., a value directly related to the mechanical strength of the particle, is no greater than about 12, and preferably the D.I. is no greater than about 6. Particles of low D.I. are more attrition resistant, will produce a lesser amount of fines than particles of higher D.I., and consequently will require lower solids make-up rates than solids of high D.I.

The Davison Index, D.I., is determined by an attrition index method based on that developed by Davison Chemical Division of W. R. Grace & Company. The method uses a jet cup attrition technique that reports as the D.I. the wt % of <20 $\mu$m fines produced in a controlled attrition test. The D.I. test apparatus consists of two main vessels, the attrition vessel and the elutriation vessel. The attrition and elutriation vessels have diameters of 9 in. and 4.5 in., respectively. Each vessel is 24 in. high and has a cone shaped bottom that slopes about 15° from vertical. The jet cup attritor which holds the sample for attrition attaches to the bottom of the attrition vessel and is 1.03 in. I.D. by 2 in. deep. A 0.0625 in. diameter hole forms the jet that enters the cup's wall horizontally and is tangent to the inside wall and bottom of the cup. A sample of 6±0.3 g is attrited for 20 minutes with $N_2$ (35% relative humidity) at a flow rate of about 21 Liters/minute, L/min (this flow rate is fine-tuned to give a D.I. of 27±2 for a standard CZB-1 Davison catalyst). Fines (wt 1) escaping the attrition vessel are collected in an extraction thimble. After the attrition the sample is transferred to the elutriation unit to separate the remainder of the <20 $\mu$m fines from the sample. The sample is placed in a cup with similar dimensions to the jet cup but with a sintered metal distributor at the bottom to uniformly fluidize the sample in the elutriator. This cup with the attrited sample is connected to the bottom of the elutriator, and the sample is elutriated for 20 min with $N_2$ (35% relative humidity) at 9 L/min. The elutriation removes the <20 $\mu$m fines from the sample to give a remaining coarse fraction (wt 3). The elutriated fines (wt 2) are collected in an extraction thimble connected to the exit of the elutriation vessel. In a separate measurement, the wt % of <20 $\mu$m fines (% Pre Att) is determined in a fresh sample. The D.I. which represents the wt % of <20 $\mu$m fines formed by the attrition is calculated from the expression $$DI = \frac{\frac{[(wt\ 1) + (wt\ 2)]}{[(wt\ 1) + (wt\ 2) + (wt\ 3)]} \times 100 - (\%\ Pre\ Att)}{100 - (\%\ Pre\ Att)} \times 100.$$

The net effect of attrition, sintering and agglomeration of the particles is to decrease, or remove particles from the process, and thereby produce a requirement to add particulate solids to the fluidized bed during operations. There is thus a relationship between solids make-up rates, SMUR, and the sum-total of the factors measured by (i), (ii), (iii) and (iv), or the performance index. Increased performance indexes result in lower SMUR; SMUR decreasing as PI are increased.

Particulate alpha aluminas useful in the practice of this invention are characterized as having a mean average diameter ranging from about 30 microns to about 150 microns, preferably from about 60 microns to about 90 microns. The particles can be produced, e.g., by grinding and classifying suitable bodies of the oxide. Particles of spherical, oblate, flat or irregular shape having a tapped bulk density ranging from about 1.2 g/cc to about 2.5 g/cc, preferably 1.2 g/cc to about 1.8 g/cc, and D.I. of less than about 12, preferably less than about 6, are selected and the outer surface of the particles purified unless the original particles are of sufficient purity ab initio to satisfy the requirements heretofore described as relates to (i) (Si+B) impurities, and (ii) (Na+Fe+Ca+Ti) impurities. Thus, the concentration of (Si+B) within the outer peripheral surface of the particle should not exceed about 5 atom percent, preferably not exceed about 2 atom percent, and not contain sufficient Si (i.e., >0.5 wt. %) or B (i.e., >500 wppm), or both Si (i.e., >0.5 wt. %) and B (i.e., >500 wppm), within the bulk particle that these elements will migrate into the outer peripheral surface layers of the particles during FBSG operations. Moreover, the sum-total concentration of Na, Fe, Ca and Ti impurities in the outer surface layer of the particles should not exceed about 20 atom percent, and preferably should not exceed about 15 atom percent. A preferred method of removing Si, B, Na, Fe, Ca and Ti from the outer surfaces of refractory inorganic oxide solids particles is to wash, contact or treat the particles with an acid sufficient to remove the impurities, or contaminants, from the surface solids without significantly altering the bulk structure, morphology, or particle size distribution and without dissolving significant amounts of the solids during the treatment. Preferably the acid is one which will not form a residue, or introduce other contaminants. Acids suitable for dissolving out the impurities without significant reaction with the solids particles, or formation of a residue, are certain of the mineral acids which can be generally characterized by a $pK_a$ (minus the logarithm of the acid dissociation constant) of about 4 or less. Such acids include such mineral acids as nitric acid, nitrous acid, sulfuric acid, and the like, carboxylic acids, e.g., formic acid, acetic acid, citric acid, and the like, and including polycarboxylic acids, e.g., oxalic acid and the like, hydroxycarboxylic acids, e.g., lactic acid and the like, fluorosubstituted carboxylic acids, e.g., trichloroacetic acid, and the like, amino acids, e.g., ethylenediaminotetracetic acid (EDTA) an the like, sulfonic acids and substituted sulfonic acids, e.g., trifluoromethanesulfonic acid and the like. Suitably, the acids are used in an aqueous medium in dilute concentrations providing from about 0.01 molar to about 2 molar, preferably from about 0.05 molar to about 1 molar, solutions. Nitric acid of about 0.05 to 1 molarity is preferred, most preferably from about 0.1 to about 0.6 molarity. Generally, treatment of the solids, e.g., particulate alpha alumina, with a dilute aqueous acid solution, e.g., a 0.1 molar nitric acid solution, over a period ranging from about 0.05 hour to about 2 hours, generally from about 0.1 hour to about 0.5 hours, will reduce the silicon and boron content in the outer peripheral surface of the particulate alpha alumina (e.g., as measured from the outer peripheral surface inwardly to a depth of 50 Å) below about 5 atom percent [i.e., (Si+B)/Al], generally below about 2 atom percent, and the concentrations of sodium, iron, calcium, and titanium (relative to aluminum) below about 20 atom percent, generally below about 15 atom percent. Acids of higher concentrations, particularly when the treatment is made at above ambient temperature, increases the rate of impurity extraction. This treatment however can result in partial dissolution, or degradation of the particles which is undesirable.

Surface composition data for the acid treated particulate oxide solids have consistently shown that the reduced concentrations of these impurities, particularly silicon and boron, in the surface region of the particles reduces greatly the tendency of the treated particles to sinter and agglomerate when subjected to FBSG conditions vis-a-vis particles otherwise similar except they are untreated and are subjected to similar FBSG conditions. Whereas the exact mechanism for this phenomenon is unknown it is believed that these surface impurities form, or contribute to the formation of, surface compounds which exhibit reduced melting points relative to that of the particulate oxide solid, or solids, not treated to reduce the surface impurities.

After acid treatment the particulate refractory inorganic oxide is collected, suitably, e.g., by filtration or other separation method, dried, and preferably calcined in air at temperatures ranging from about 400° C. to about 1400° C., and higher preferably from about 400° C. to about 800° C., prior to use. Calcination generally decomposes and desorbs residues, if any, such as nitrate or sulfate which, if not removed, may adversely affect process hardware.

Particulate alpha aluminas, made by processes which though more expensive to operate and consequently greatly increase the cost of the particulate solids, are also useful in the process of this invention if the particulate solids product is of sufficient purity to meet the peripheral outer surface requirements, i.e., $\leq 5$ atom percent (preferably $\leq 2$ atom percent) Si+B concentration, and preferably also $\leq 20$ atom percent (more preferably $\leq 15$ atom percent) concentration of Na, Fe, Ca, Ti impurities, respectively, and the surface of the particles below the peripheral outer surfaces of the particles contain Si and B in concentrations sufficiently low that the Si and B do not migrate into the peripheral outer surface of the particles at FBSG operating conditions. Synthetic particulate aluminas of this purity can be made, e.g., by the use of high purity chemical compounds. Also solids of sufficiently high bulk purity can be treated with fluxing compounds to reduce the peripheral outer surface concentrations of Si and B and Na, Fe, Ca and Ti, respectively, to acceptable levels. A final calcination step is generally required to burn out, and remove the fluxing agent, or agents.

In a particularly preferred embodiment, the present invention is one comprising an admixture of, as a heat transfer component, the particulate alumina and a catalyst, the average particle diameter of both the heat transfer component and the catalyst ranging from about 30 microns to about 150 microns, preferably from about 60 microns to about 90 microns. The catalyst is constituted of a support, or carrier, notably a refractory inorganic oxide, particularly alumina, with which is composited a metal, or metals, e.g., nickel, platinum, ruthenium or the like, catalytic for the production of hydrogen and carbon monoxide from low molecular weight hydrocarbons contacted with a fluidized bed of the catalyst at high temperature hydrothermal conditions. Suitably the catalyst is a nickel-on-alumina catalyst, and preferably a nickel-on-alpha alumina catalyst, of particle size distribution corresponding to that of the heat transfer component. An admixture constituted of from about 10 percent to about 99.9 percent of said particulate heat transfer solid, preferably from about 80 percent to about 99.5 percent, and from about 0.1 percent to about 90 percent, preferably from about 0.5 percent to about 20 percent, of the catalyst, based on the total weight of the admixture (dry basis), can be fluidized at temperatures ranging to about 2000° F. (1093° C.), particularly at temperatures ranging between about 1600° F. (871° C.) and 2000° F. (1093° C.), and contacted with a low molecular weight hydrocarbon, e.g., $C_1$-$C_4$ alkanes, predominantly methane, in the presence of steam, or oxygen (air), or both steam and oxygen (air), to produce syn gas without significant sintering of the particulate solids components of the admixture. Likewise, there is no significant disintegration of either component of the admixture to fines, or degradation of the particles of the admixture to produce agglomerates. In short, the heat transfer solids are highly resistant to sintering, attrition and agglomeration per se, and impart high resistance to sintering, attrition and agglomeration of the catalyst.

The catalyst component of the fluidized bed contains preferably from about 1 percent to about 20 percent nickel, more preferably from about 5 percent to about 10 percent nickel, composited with an alumina support, preferably an alpha alumina support. The mean average diameter of the catalyst particles ranges from about 30 microns to about 150 microns, preferably from about 60 microns to about 90 microns; particles of size distribution which can be readily fluidized along with the particulate heat transfer solids and contacted, e.g., with a light hydrocarbon feed, $C_1$-$C_4$ alkanes, predominantly methane and steam, or methane and an oxygen-containing gas (air), or methane and both steam and oxygen, at elevated temperature sufficient to convert the hydrocarbon feed to syn gas without significant degradation of the particles of the bed to fines, sintering, or catalyst agglomeration.

The invention will be better understood via the following examples which illustrate specific and preferred embodiments.

Example 1

A series of particulate alpha alumina solids of different morphology, density and attrition resistance was obtained from several manufacturers for testing in a FBSG unit. The morphology, tapped bulk density and Davison Attrition Index, and general source of these aluminas, materials having a wide range of properties, are given in Table 1A.

TABLE 1A

Properties of Alpha Aluminas

| Sample No./Source | Morphology | Tapped Bulk Density (g/cc) | Davison Attrition Index |
|---|---|---|---|
| A - Company AX | Spray dried spheres | 1.7 | 2.6 |
| B - Company AX | Hollow spheres | 1.5 | 4.2 |
| C - Company BX | Tabular | 2.2 | 3.2 |

TABLE 1A-continued

Properties of Alpha Aluminas

| Sample No./Source | Morphology | Tapped Bulk Density (g/cc) | Davison Attrition Index |
|---|---|---|---|
| D - Company CX | Spray dried spheres | 1.4 | 8.0 |
| E - Company CX | Spray dried spheres | 1.8 | 1.8 |
| F - Company DX | Spray dried spheres | 1.6 | 9.7 |
| G - Company EX | Granular | 1.3 | >20 |
| H - Company FX | Tabular | 2.4 | 0.8 |
| I - Company FX | Tabular | 2.3 | 2.5 | also includes XPS data obtained using a Leybold-Heraeus Instrument employing magnesium and aluminum X-ray anodes. The table also includes the sum of the surface atomic ratios for (Na+Ca+Fe+Ti)/Al, and includes separately the surface (Si+B)/Al atomic ratios; to wit:

TABLE 1B

Agglomeration Data For Alpha Aluminas

| Sample No./ Source | Conversion to +106 μm Aggregates at Temp (%) | | Solids Make-up Rate | XPS Atomic Ratios | | Performance Index |
|---|---|---|---|---|---|---|
| | 1600° C. | 1650° C. | | (Na + Ca + Fe + Ti)/Al | (Si + B)/Al | |
| A - Company AX | 81 | 90+ | 92.6 | 0.13/0.15 | 0.14/0.16 | 11 |
| B - Company AX | <1 | 20 | 24.2 | 0.11 | <0.02 | >72 |
| C - Company BX | 52 | 75 | 78.2 | 0.11/0.13 | 0.08/0.085 | 14 |
| D - Company CX | | 18 | 26.0 | 0.16 | 0.017 | 33 |
| E - Company CX | 1 | 5 | 6.8 | 0.15/0.10 | 0.027/0.056 | 59 |
| F - Company DX | 30 | 70 | 79.7 | 0.17/0.13 | 0.072/0.084 | 5 |
| G - Company EX | 12 | 20 | 40.0 | 0.18 | 0.023 | 9 |
| H - Company FX | 3 | 7 | 7.8 | 0.12/0.11 | 0.021/0.045 | 137 |
| I - Company FX | 1.2 | 29 | 31.5 | 0.11 | 0.044 | 36 |

The following Table 1C. tabulates further XPS data of measured surface impurity distributions for the alpha aluminas. These data show clearly that the agglomeration characteristics quantitatively correlates quite well with surface atomic ratios.

TABLE 1C

Surface Impurity Distributions For Alpha Aluminas As Measured by XPS

| Sample No./Source | XPS Atomic Ratio | | | | | |
|---|---|---|---|---|---|---|
| | (Na/Al) | (Si/Al) | (Ca/Al) | (B/Al) | (Fe/Al) | (Ti/Al) |
| A - Company AX | 0.12 | 0.14 | 0.010 | ND | 0.0036 | NM |
| | 0.11 | 0.16 | 0.016 | ND | NM | 0.008 |
| B - Company AX | 0.11 | <0.015 | <0.005 | ND | ND | ND |
| C - Company BX | 0.10 | 0.034 | 0.012 | 0.046 | 0.002 | 0.002 |
| | 0.12 | 0.034 | 0.012 | 0.051 | NM | 0.003 |
| D - Company CX | 0.15 | 0.017 | <0.007 | ND | ND | ND |
| E - Company CX | 0.12 | 0.027 | 0.026 | ND | ND | ND |
| | 0.072 | 0.042 | 0.022 | 0.014 | 0.001 | 0.012 |
| F - Company DX | 0.13 | 0.062 | 0.025 | 0.010 | ND | 0.016 |
| | 0.093 | 0.068 | 0.022 | 0.016 | 0.001 | 0.018 |
| G - Company EX | 0.12 | 0.013 | 0.008 | <0.010 | ND | 0.054 |
| H - Company FX | 0.11 | 0.011 | 0.011 | <0.010 | ND | ND |
| | 0.082 | 0.032 | 0.010 | 0.013 | 0.002 | 0.013 |
| I - Company FX | 0.083 | 0.030 | 0.019 | 0.014 | 0.001 | 0.010 |

Note:
NM = Not Measured
ND = Not Detectable

These samples were each tested in a small fixed bed sintering test developed to assess the agglomeration resistance of particulate oxides in fluid bed syn gas generation. In this test, an 8–10 gram sample of the particulate oxide was distributed in a small Coors alumina boat. The sample was placed in a high temperature Lindberg furnace and heated from room temperature to 1600° C. or 1650° C., respectively, over a period of about 90 minutes. The sample was then held at 1600° C. or 1650° C. for a period of 2 hours to induce thermal sintering and agglomeration. The sample was then cooled to about 100° C. over a period of 6–12 hours and removed from the oven. The sample was then transferred to a sonic sieve operated at a constant power level, and the conversion of 45 to 106 μm particles to fused aggregates greater than 106 μm in size was determined by weighing the fractions collected on a 150 mesh size screen.

The results of these tests are given in Table 1B. The table gives the amount of conversion of the particles to agglomerates of +106 μm particle size at 1600° C. and 1650° C., respectively, the calculated performance index, PI, and the solids make-up rate, SMUR. The table A wide range of agglomeration results were found for the different aluminas, noting particularly the large performance differences between the best, i.e., Samples B, D, E, H and I, and the worst, i.e., Samples A, C and F. The Company AX spray dried spheres, Company BX tabular alumina and spray dried aluminas, and Company FX tabular aluminas exhibited performance indexes greater than 20. The deficiencies of the aluminas other than these are also exhibited by poor attrition resistance or poor fluidizaton quality, or both.

Four of the aluminas were also studied in FBSG pilot plant operations at 1700°–1800° F. (927° C.–982° C.) and 360 PSIG using water, oxygen, and methane feeds. Table 2 compares agglomeration rates for Company AX spray dried spheres, Company BX tabular alumina, Company FX tabular alumina, and Company AX hollow spheres under similar severity process conditions. Referring to Table 2, it is apparent that the hollow spheres exhibited superior performance. It is particularly notable that these results correlate with the agglomeration results.

TABLE 2

| Relative Agglomeration Rates In FBSG Process Studies | |
|---|---|
| Heat Transfer Solid | Relative Rate of Agglomeration to 90+ μm Fused Aggregates |
| Company AX spray dried alumina | >10 |
| Company BX tabular alumina | 3 |
| Company FX tabular alumina | 1-base |
| Company AX hollow sphere alumina | 0.6 |

Having described the invention, what is claimed is:

1. As a composition of matter, a heat transfer solid resistant to sintering and agglomeration for admixture with a catalyst to form a fluidized bed useful in the conversion of a low molecular weight hydrocarbon to hydrogen and carbon monoxide on contact therewith at high temperature in the presence of steam, or oxygen, or both steam and oxygen which comprises
alumina solids particles
   (i) the outer peripheral surface layer of which contains no greater than about 5 atom percent silicon and boron, based on the total number of aluminum cations within said outer peripheral surface layer, while the bulk concentration of silicon in the particles does not exceed about 0.5 percent, based on the weight of the alumina solids, and the bulk concentration of boron in the particles does not exceed about 500 ppm, based on the weight of the alumina solids;
   (ii) the outer peripheral surface layer of which contains no more than 20 atom percent impurities based on the sum-total concentration of sodium, iron, calcium, and titanium as impurities;
   (iii) the tapped bulk density of the particles ranges from about 1.2 g/cc to about 2.5 g/cc;
   (iv) the Davison Attrition Index of the solids particles is no greater than about 12; and the sum-total effect of these relationships between surface purity particle density, and attrition resistance is such as to provide a performance index categorized by the formula $$\text{Performance Index} = \frac{1}{(i) \times (ii) \times (iii) \times (iv)} > 20.$$

2. The composition of claim 1 wherein the performance index is greater than about 40.

3. The composition of claim 1 wherein the heat transfer solid is alpha alumina.

4. The composition of claim 1 wherein (i) the outer peripheral surface layer of the particles contain no greater than about 2 atom percent silicon and boron, based on the total number of aluminum cations within the outer surface layer of the particle.

5. The composition of claim 4 wherein (ii) the outer surface layer of the alumina particles contain no more than about 15 atom percent impurities based on the sum-total concentration of all of sodium, iron, calcium and titanium as impurities.

6. The composition of claim 1 wherein the outer peripheral surface layer of the alumina particles contain no more than about 2 atom percent silicon and boron, and no more than about 15 atom percent impurities based on the sum-total concentration of all of sodium, iron, calcium and titanium.

7. The composition of claim 1 wherein the tapped bulk density of the alumina solids ranges from about 1.2 g/cc to about 1.8 g/cc.

8. The composition of claim 1 wherein the Davison Jet Attrition Index is less than about 6.

* * * * *